May 11, 1943.   P. O. PERSSON   2,318,709
GAUGE FOR METALLIC CARTRIDGE BELT LINKS
Filed Feb. 18, 1942   2 Sheets-Sheet 1

Inventor
Per O. Persson

May 11, 1943.    P. O. PERSSON    2,318,709
GAUGE FOR METALLIC CARTRIDGE BELT LINKS
Filed Feb. 18, 1942    2 Sheets-Sheet 2
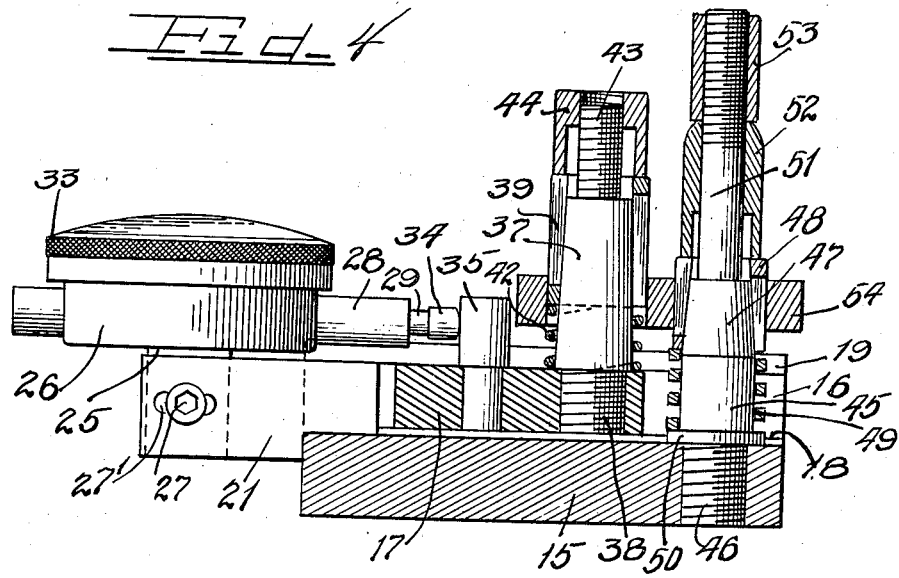
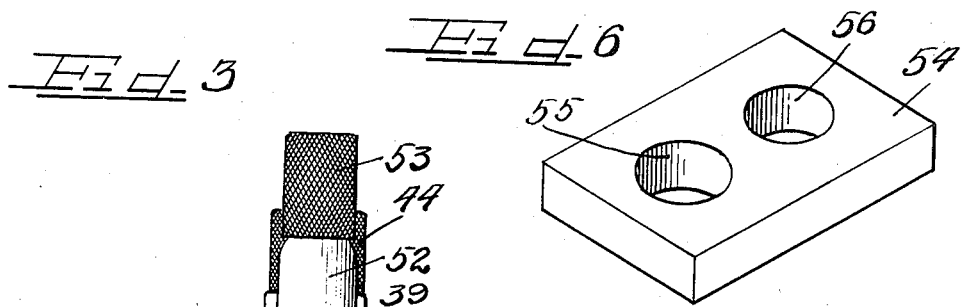
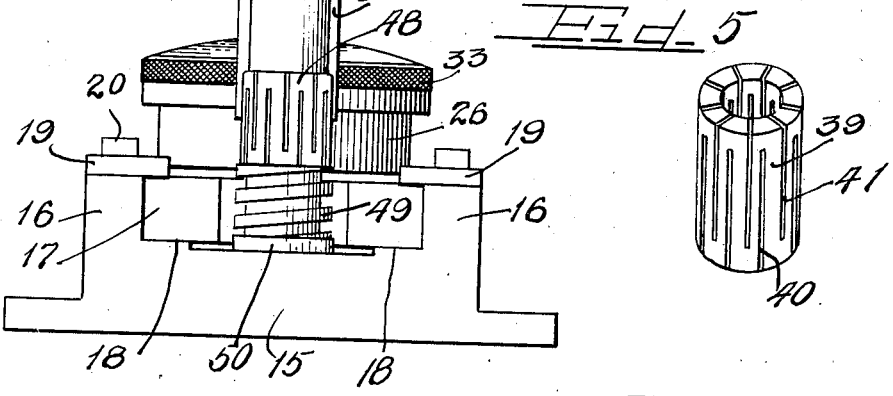
Inventor
Per O. Persson
by Charles ??? Attys.

Patented May 11, 1943

2,318,709

UNITED STATES PATENT OFFICE 2,318,709

GAUGE FOR METALLIC CARTRIDGE BELT LINKS

Per O. Persson, Chicago, Ill., assignor to Quality Hardware and Machine Corporation, Chicago, Ill., a corporation of Illinois Application February 18, 1942, Serial No. 431,335

3 Claims. (Cl. 33—174)

My invention relates to an improved gauge adapted particularly for gauging metallic cartridge belt links such as are disclosed in Laystrom Patent No. 2,232,071 dated February 18, 1941 or in the pending application of Hilding A. Laystrom and Per O. Persson Serial No. 388,504, filed April 14, 1941.

Before these links are acceptable for use in cartridge belts, they must be tested for dimension accuracy. For example, the distance between the axis of the cartridge holding loop and the axis of the hinge loop must be within certain tolerance. During handling of the links after manufacture thereof the loops may become distorted or partly opened so that the distance between the loop axes is not within the prescribed tolerance and such links would not be acceptable.

It is the important object of my invention to provide a very simple accurate gauge structure by means of which any variation of the distance between axes of the links from the predetermined tolerance will be accurately indicated so as to quickly determine whether a tested link is acceptable or not.

My improved gauge structure is disclosed on the drawings, in which:

Figure 3 is an end elevation;

Figure 4 is a section on plane IV—IV of Figure 1;

Figure 5 is a perspective view of one of the expansion bushings; and

Figure 6 is a perspective view of a gauge block for setting the gauge for testing.

Figure 1:
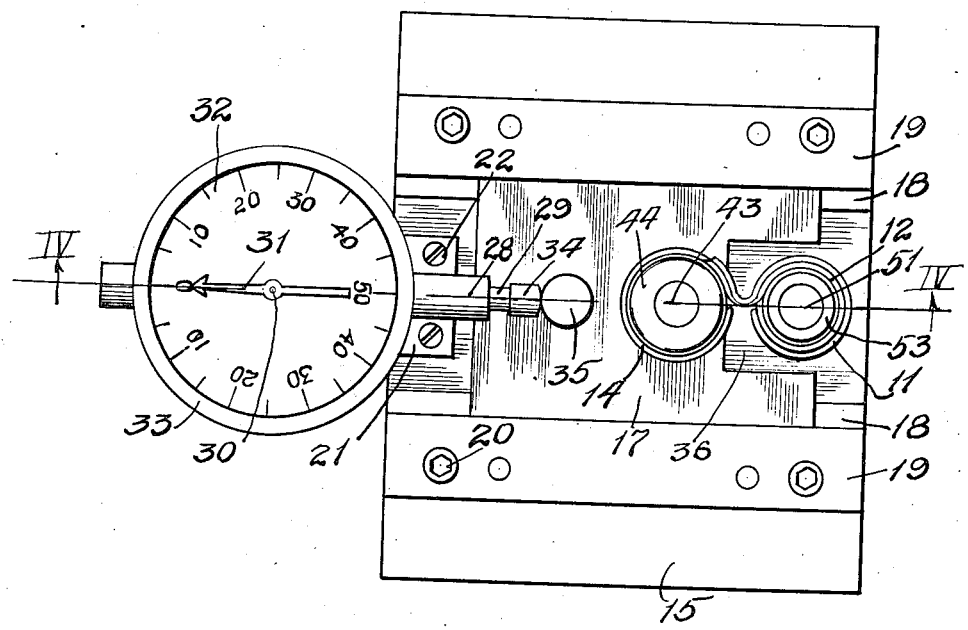
Figure 1 is a plan view of the gauge showing a link thereon being tested.

My improved gauge can be employed for testing different types of links having loops whose axes are spaced apart and parallel. On the drawings I have shown a link such as is disclosed in the Laystrom Patent No. 2,232,071 of February 18, 1941. Briefly describing the link, it comprises the transversely extending body part 10 from one edge of which at the ends thereof extend the circular loops 11 and 12 with axes coinciding but with the loops separated by a space 13, a circular loop 14 extending from the other edge of the body part in alignment with the space 13. The loops 11 and 12 receive respectively the body portion and contracted forward end of a cartridge, and the loop 14 serves as a hinge for engaging in the space 13 of an adjacent link to receive the body of a cartridge. In order that the link may be acceptable for use, the distance between the axis of the loops 11 and 12 and that of the loop 14 must be within certain tolerances, usually some thousandths of an inch.

Describing now the testing gauge shown, it comprises a base 15 having upwardly extending side walls 16 between which extends a slide plate or block 17 slidable on the horizontal guideways 18, guide plates 19 being detachably secured, as by screws 20, to the tops of the side walls 16 to overhang the slide plate 17 to hold it to its guideways 18.

At the left end of the base 15 a supporting block or bracket 21 is secured, as by screws 22, the outer end of the bracket having a vertical slot 24 into which extends a stem 25 depending from an indicating gauge structure 26, this gauge structure being adjustable longitudinally and locked in such position by a bolt 27 extending through the stem 25 and slots 27' in the bracket 21. The body of the gauge indicator has the tubular arm 28 extending radially therefrom over the path of the slide or block 17, an actuating rod 29 extending through the outer end of the arm from mechanism (not shown) within the gauge body for translating longitudinal movement of the rod into rotational movement of an arbor 30 which supports an indicating needle 31 cooperable with a calibrated dial 32 secured in the cover 33 of the gauge, which cover is rotational on the gauge with the dial for setting of the dial zero indication relative to the needle or pointer 31.

At its outer end the rod terminates in an abutment end 34 for engagement by an abutment stud 35 extending upwardly from the slide or plate 17. The indicating gauge 26 is of the well known type constructed so that upon inward shift of the rod 29 the pointer will be rotated in one direction, and upon release of the rod, spring means within the gauge will swing the pointer in the opposite direction and shift the rod outwardly.

At its right end the slide or plate is cut out to leave a recess 36, in advance of which a testing post 37 extends vertically upwardly from the plate and secured thereto by its threaded end 38. The post 37 is frusto-conical or tapered and receives an expansible bushing 39. This bushing, as best shown on Figures 4 and 5, is cylindrical is on its outer side but its inner side is tapered to fit the taper of the post 37, the bushing being slit longitudinally alternately in opposite directions as indicated at 40 and 41 so that the bushing is expansible and contractible radially as it is moved along the tapered post 37. A helical spring 42 encircles the post 37 between the plate 17 and the lower end of the bushing 39 and tends to shift it upwardly on the post. At its upper end the post has the reduced threaded extension 43 for receiving a hollow nut 44 for engaging against the top of the bushing 39 to shift it downwardly on the post 37 against resistance of the spring. Downward shift of the bushing on the post by operation of the nut 44 causes the bushing to radially expand, while, after release of the nut, the spring shifts the bushing upwardly on the post for contraction of the bushing.

Extending upwardly from the base 15 at the right end thereof is a testing post 45 rigidly secured by its threaded end 46 to the base. The upper portion 47 of the post is frusto-conical and receives a bushing 48 which is constructed like the bushing 37 for engagement with the frusto-conical part 47 for radial expansion or contraction. A spring 49 interposed between the bushing and the flange 50 on the post tends to shift the bushing upwardly.

A reduced stem 51 extends upwardly from the post 45 for receiving a testing sleeve 52, the outer end of the stem being threaded for reception of a nut 53. By screwing down the nut 53 the sleeve 52 shifts the bushing 48 downwardly against the resistance of the spring 49 for expansion of the bushing on the frusto-conical part 47, and upon release of the nut the spring will shift the bushing upwardly for contraction thereof. The post 45 extends through the clearance recess 36 in the slide or plate so that slide or plate with the post 37 thereon may shift toward or away from the post 45.

When testing a link, the bushing 39 receives the link loop 14, while the bushing 48 receives the link loop 11, the sleeve 52 receiving the link loop 12, the upper end of the sleeve being rounded to facilitate application of the link thereto. However, before links are to be tested, the testing posts are set with their axes a distance apart which should be the desired distance between the axis of the loops 11 and 12 and the axis of the loop 14. Setting of the test post is accomplished by means of a gauge plate 54, this plate having the cylindrical holes 55 and 56, the distance between whose axes is the distance to which the links will be gauged. As illustrated on Figure 4, the nuts 44 and 53 are loosened for upward shift and contraction of the bushings, the gauge plate 54 then being applied for reception of the bushing 39 in the hole 55 and reception of the bushing 48 in the hole 56. The nuts are then turned down for expansion of the receptive bushings until these bushings snugly fit in the respective gauge plate holes, and then the gauge indicator cover 33 with the dial thereon is turned to bring the zero indication to the indicating end of the pointer 31. After setting of the test posts with their axes the test distance apart, the gauge plate is removed and the gauge structure is then ready for gauging of links.

The slide or plate 17 with the test post 37 thereon may become displaced from the gauge plate setting and the gauge indicator pointer will swing away from zero as the actuating rod 29 follows the movement of the abutment post 35 on the plate 17, but the plate 17 will be moved back toward the gauge plate set position when a link is applied to the test post.

Figure 2:
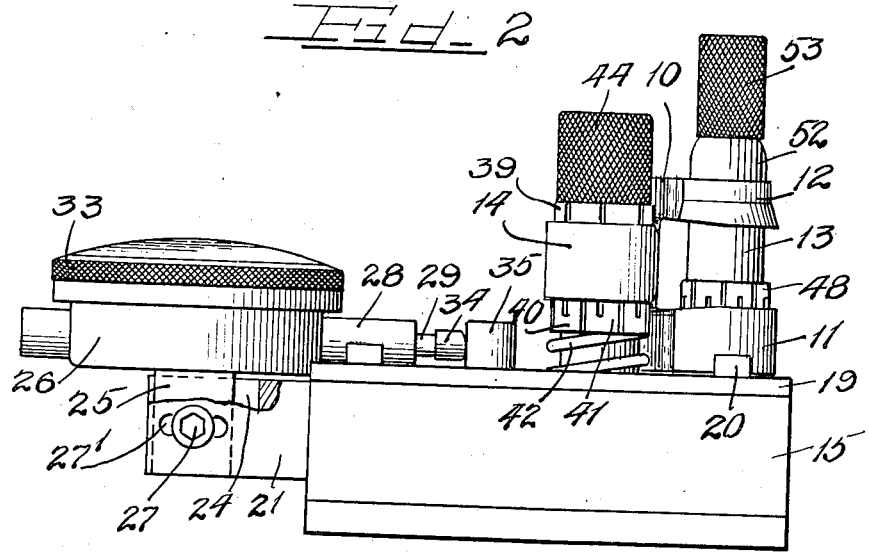
Figure 2 is a side elevation.

Figures 1 and 2 show such application of a link to be tested. Before application of the link, the nuts 44 and 53 are loosened up sufficiently for contraction of the bushings 39 and 48 so that the bushing 39 may readily receive the loop 14 of the link and the bushing 48 may readily receive the loop 11 of the link, while the loop 12 passes down the sleeve 52 which is of a diameter to fit the loop 12. After thus applying the link, the nuts 44 and 53 are separately turned down for contraction of the respective bushings until these bushings are snugly received in the respective loops without distorting these loops. Now, if the distance between the axis of the loops 11 and 12 and the axis of the loop 14 is within the specified tolerance, then the gauge indicator or pointer will indicate such tolerance. If the difference between axes of the link is the same as the distance between the axes of the holes 55 and 56 in the gauge plate, then the pointer will indicate zero. If this distance between axes of the link being tested is greater than the correct distance, the gauge rod 29 will be shifted inwardly for corresponding movement of the pointer to one side of zero, and if the distance is less than the correct distance, then the pointer will be swung in the opposite direction from zero. If the swing of the needle indicates differences which are within the predetermined tolerances, then the link will be acceptable for use. For example, the tolerance might be a number of thousandths of an inch, and the gauge dial could be calibrated to indicate thousandths of an inch so that the variation in thousandths of an inch of the distance between axes of a tested link would be indicated in thousandths of an inch on the dial. After a setting of the test post by the gauge plate and setting of the indicator gauge to zero, any number of links can then be tested for accuracy. The nuts 44 and 53 are of such diameter that the loops of a link to be tested will move readily past the nuts for application to the bushings. These nuts and also the cover 33 of the indicating gauge are preferably knurled so that they may be readily adjusted.

As the support for the gauge indicator is adjustable and as different sizes of bushings may be provided for the testing post, the gauge structure may be set for testing of different sizes of links of the same type, or other types of links having loops whose axes are spaced apart and parallel.

I have shown a practical and efficient embodiment of my invention but I do not desire to be limited to the exact construction and arrangement shown and described as changes and modifications may be made without departing from the scope of the invention.

I claim as my invention:

1. A test gauge for metallic cartridge belt links which have two circular loops the distance between whose parallel axes should be of predetermined standard, comprising a stationary post structure having a frusto-conical seat and an expansible and contractible bushing engaging said seat, a movable post structure having a frusto-conical seat and an expansible and contractible bushing engaging said seat, said post structures being adapted to be set for the standard distance between their axes, measuring and indicating means adapted to follow the movement of said movable post structure, said post structures after such setting adapted to receive a link to be tested with the loops of the link engaging said bushings respectively, means for controlling the expansion and contraction of said bushings on said frusto-conical seats for accurate engagement of the bushings in the link loops, said measuring and indicating means functioning to measure and indicate any variation of the distance between said post structure axes from the standard distance when a link to be tested is applied to the post structures.

2. A test gauge structure for a metallic cartridge belt link which has two circular loops the distance between whose parallel axes should be standard within certain tolerances to make the link acceptable for use, comprising a stationary frusto-conical post structure and an expansible and contractible bushing thereon, a support movable relative to said stationary post structure and a frusto-conical post structure on said movable support and a contractible and expansible bushing on said post structure, said bushings being adapted to receive respectively the loops of the link to be tested, a measuring instrument having an indicating element adapted to follow the movement of said movable support and post structure thereon and to indicate the setting of said post structures for standard distance between the loop axes, adjusting means adapted after application of a link to be tested to said post structures for controlling the cooperation of said bushings with the frusto-conical surfaces of said post structures to effect expansion or contraction of the bushings to fit into the respective loops, whereby any variation in the distance between the axes of said post structures from the standard distance resulting from application of the link to the post structures will be measured and indicated by said instrument.

3. A test gauge for testing the distance between the axes of a pair of loops and a single loop on opposite sides of a metallic cartridge belt link of the type described, comprising a stationary post, a movable post, a gauge mounted to follow the movement of said movable post, said movable post having a frusto-conical portion and having an expansible and contractible bushing thereon for receiving the single loop of a link, a spring tending to move said bushing upwardly on said frusto-conical portion, a nut having threaded engagement with said movable post for moving said bushing downwardly on said frusto-conical portion, said stationary post having a frusto-conical portion with an expansible and contractible bushing thereon for receiving one of said pair of loops on the link, a spring tending to move said bushing upwardly on the frusto-conical portion of said stationary post, a sleeve on said stationary post above the bushing thereon for receiving the other loop of the pair of loops, a nut threading on the upper end of said stationary post for engaging said sleeve and for shifting said sleeve downwardly for downward movement of the bushing on said stationary post, movement of said bushings by said springs and nuts functioning to set said bushings for accurately receiving the loops of the link, said gauge measuring and indicating any variation of the distance between said post axes from a predetermined standard distance when the link to be tested is applied to said bushings.

PER O. PERSSON.